March 1, 1927.  V. A. NELSON  1,619,751

HYDRAULIC CLUTCH

Filed April 21, 1926  2 Sheets-Sheet 1

Inventor
V. A. Nelson
By Clarence A. O'Brien
Attorney

March 1, 1927.

V. A. NELSON 1,619,751

HYDRAULIC CLUTCH

Filed April 21, 1926  2 Sheets-Sheet 2

Inventor

V. A. Nelson

By Clarence A. O'Brien

Attorney

Patented Mar. 1, 1927.

1,619,751

UNITED STATES PATENT OFFICE.

VERNER A. NELSON, OF LYNDEN, WASHINGTON.

HYDRAULIC CLUTCH.

Application filed April 21, 1926. Serial No. 103,580.

My present invention pertains to hydraulic clutches, and contemplates the provision of an efficient hydraulic clutch that is simple and inexpensive in construction and is susceptible of ready and nice control.

Other objects and practical advantages of the invention will be fully understood from the following description and claim when the same are read in connection with the drawings, accompanying and forming part of this application, in which:—

Figure 3 is a fragmentary section showing the control means of my improvement and hereinafter explicitly referred to.

Similar numerals of reference designate corresponding parts in all of the views of the drawings.

Figure 1:
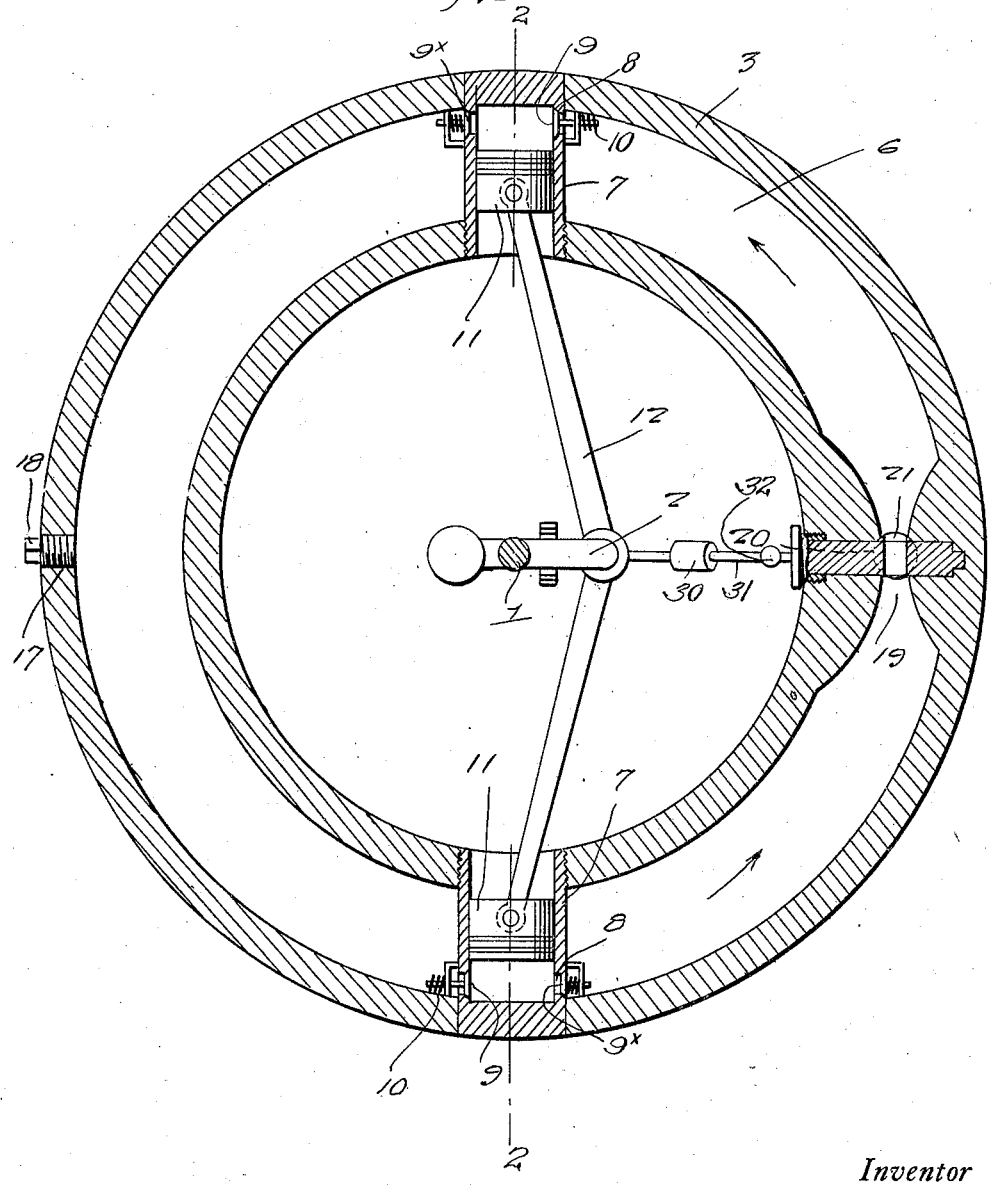
Figure 1 is a vertical transverse section showing the hydraulic clutch constituting the best practical embodiment of my invention which I have devised.
Figure 2:
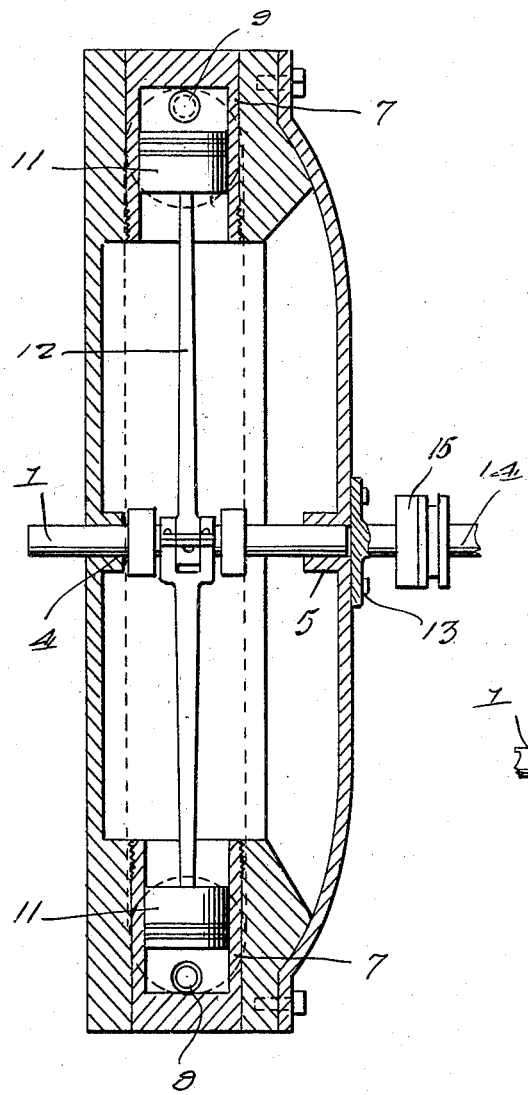
Figure 2 is a central longitudinal section of the clutch with certain of the parts in elevation; the sectional part being taken substantially on the line 2—2 of Figure 1.
Figure 3:
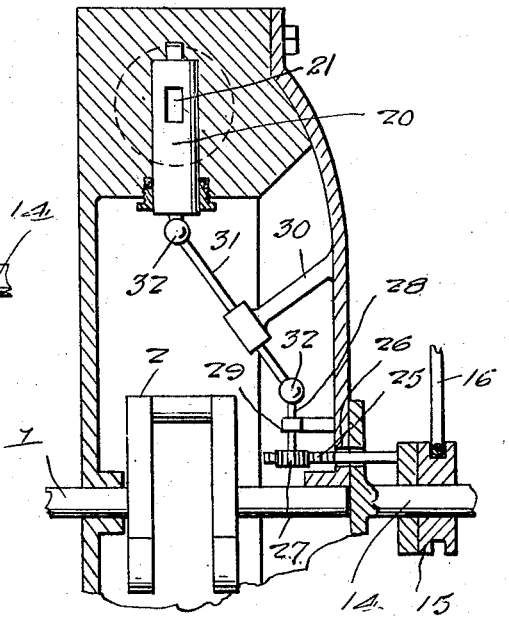

I show in Figures 1 to 3 a shaft 1 designed to be rotated by a suitable motor. not shown, and equipped with a crank 2. I also show in said figures the hollow rotor 3 of my improvement; the said rotor 3 enclosing and forming a housing for the crank bearing portion of the shaft 1, and being provided with bearings 4 and 5 for said shaft 1. The said rotor 3 is further characterized by an oil race 6, of annular form, and by diametrically opposite piston cylinders 7, the said cylinders 7 having ports 8 at diametrically opposite points therein and being equipped with valves 9, 9× influenced by springs 10 and all adapted to open under the pressure of oil in a common direction about the center of the shaft 1. The valves 9 are disposed within the cylinders 7 and seat outwardly while the valves 9× are disposed outwardly beyond the cylinders 7 and seat inwardly. Movable rectilinearly in the clyinders 7 are pistons 11, and interposed between the said pistons 11 and the crank 2 are rods 12.

Fixed in appropriate manner at 13 to the rotor 3 and alined with the shaft 1 is a shaft 14, and slidable on the said shaft 14 is a manually movable member 15, said member 15 being by preference, circumferentially grooved, and being preferably, though not necessarily, movable through the medium of a fork 16.

At 17 is an aperture for filling the race 6 with oil or other liquid appropriate to the purpose of my invention, and at 18 is a plug for normally closing the said aperture 17.

The oil race 6 is provided at 19, Figure 1, with a contracted portion, and for controlling the passage of oil through said portion 19, I employ a valve 20, apertured at 21, and arranged in the rotor 3 so as to be rockable or turnable about its axis. The member 15 is equipped with a rack bar 25, Figure 3, said rack bar being movable rectilinearly in an opening 26 in one wall of the rotor 3 and being meshed with a spur gear 27 carried by a shaft 28 journaled at 29 in an appropriate bearing carried by the said wall of the rotor 3. Mounted in a bracket 30 and carried by said rotor wall is a shaft section 31 interposed between the shaft 28 and the inner end of the valve 20. The said shaft 31 is connected with the shaft 28 and the valve 20 by universal joints 32 as illustrated.

In the practical operation of my improvement it will be understood that when the valve 20 is in full opened position as shown in Figure 1, the oil in the race 6 will be free to circulate under the action of the pistons 11, and hence the rotor 3 will remain idle notwithstanding the shaft 1 is rotating and the pistons 11 are being reciprocated from said shaft 1. When, however, the valve 20 is closed, the circulation of oil in the race 6 is stopped and resistance is offered to the outward movement of the pistons 11 and this brings about rotation of the rotor 3; also, that incident to the closing of the valve 20 the speed of the rotor 3 and the shaft 14 will be increased until the said rotor 3 and shaft 14 are driven direct, as a unit, from the shaft 1.

Notwithstanding the capacity of function ascribed to my novel clutch, it will be appreciated from the foregoing that the clutch is simple and inexpensive in construction, and in general is well adapted to withstand the usage to which devices of corresponding character are ordinarily subjected.

I have entered into a detailed description of the construction and relative arrangement of the parts embraced in the present and preferred embodiment of my invention in order to impart a full, clear and exact understanding of said embodiment. I do not desire, however, to be understood as limiting myself to the precise construction and relative arrangement of parts as disclosed, my invention being defined by my appended claim within the scope of which modifications may be made without departure from my invention.

Having described my invention, what I claim and desire to secure by Letters-Patent, is:—

In a hydraulic clutch and in combination, a shaft adapted to be driven by a suitable motor and having a crank, a hollow rotor rotatable about said shaft and containing the crank thereof and having an oil race with a restricted portion, diametrically opposite piston cylinders intersecting said race and having opposite valve controlled ports, pistons movable in said cylinders and connected with the crank of said shaft, a valve of rotary type mounted to control the restricted portion of the oil race, a shaft fixed with respect to the rotor and alined with the first-named shaft, a member movable rectilinearly on said shaft, a rack bar connected with said member and movable in an aperture in one wall of the rotor, a shaft mounted within the rotor and having a spur gear meshed with said rack bar, and a shaft section journaled in the rotor and interposed between and connected with the shaft carrying the spur gear and the said rotary valve.

In testimony whereof I affix my signature.

VERNER A. NELSON.